United States Patent [19]
Larson

[11] Patent Number: 6,028,613
[45] Date of Patent: *Feb. 22, 2000

[54] METHOD AND APPARATUS FOR PROGRAMMING A GRAPHICS SUBSYSTEM REGISTER SET

[75] Inventor: Michael Larson, Kirkland, Wash.

[73] Assignee: S3 Incorporated, Santa Clara, Calif.

[ * ] Notice: This patent is subject to a terminal disclaimer.

[21] Appl. No.: 08/821,125

[22] Filed: Mar. 20, 1997

[51] Int. Cl.[7] ...................................................... G06F 15/00
[52] U.S. Cl. ............................ 345/522; 345/516; 345/513
[58] Field of Search ..................................... 345/501, 507, 345/509, 513, 515, 516, 521, 522, 430

[56] References Cited

U.S. PATENT DOCUMENTS

| | | | |
|---|---|---|---|
| 4,583,185 | 4/1986 | Heartz et al. | 364/521 |
| 4,586,038 | 4/1986 | Sims | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/458 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,905,164 | 2/1990 | Chandler et al. | 364/518 |
| 4,958,305 | 9/1990 | Piazza | 364/522 |
| 4,965,745 | 10/1990 | Economy et al. | 364/518 |
| 5,126,726 | 6/1992 | Howard et al. | 340/728 |
| 5,187,754 | 2/1993 | Currin et al. | 382/54 |
| 5,191,642 | 3/1993 | Quick et al. | 395/127 |
| 5,268,996 | 12/1993 | Steiner et al. | 395/126 |
| 5,293,467 | 3/1994 | Buchner et al. | 395/122 |
| 5,357,579 | 10/1994 | Buchner et al. | 382/1 |
| 5,367,615 | 11/1994 | Economy et al. | 395/129 |
| 5,420,970 | 5/1995 | Steiner et al. | 395/133 |
| 5,524,265 | 6/1996 | Balmer et al. | 395/800 |
| 5,657,479 | 8/1997 | Shaw et al. | 345/515 |
| 5,706,478 | 1/1998 | Dye | 345/522 |
| 5,793,386 | 8/1998 | Larson et al. | 345/522 |
| 5,796,413 | 8/1998 | Shipp et al. | 345/522 |

FOREIGN PATENT DOCUMENTS

| | | | |
|---|---|---|---|
| WO 96/36011 | 11/1996 | WIPO | G06T 3/00 |

*Primary Examiner*—Kee M. Tung
*Attorney, Agent, or Firm*—Fenwick & West LLP

[57] ABSTRACT

A graphics system includes a graphics processor for rendering graphics primitives with a display list. A host processor generates a display list which includes a command format for loading the display list into a register file. The graphics processor includes logic to encode and decode the command register to sequentially load the display list into the register file without a physical reference to the register being loaded. The command register may also be programmed to allow the graphics processor to randomly load the register file thereby shortening the processing of the display list and allowing the display list to be written during a burst cycle mode of bus operation.

11 Claims, 7 Drawing Sheets

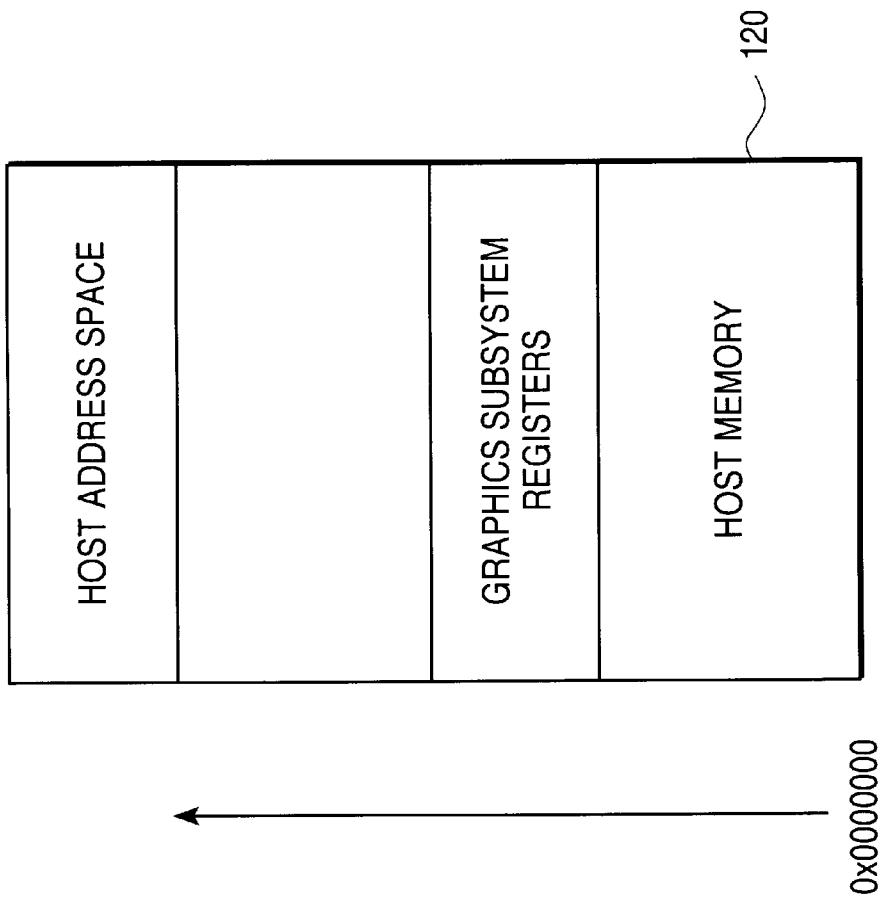

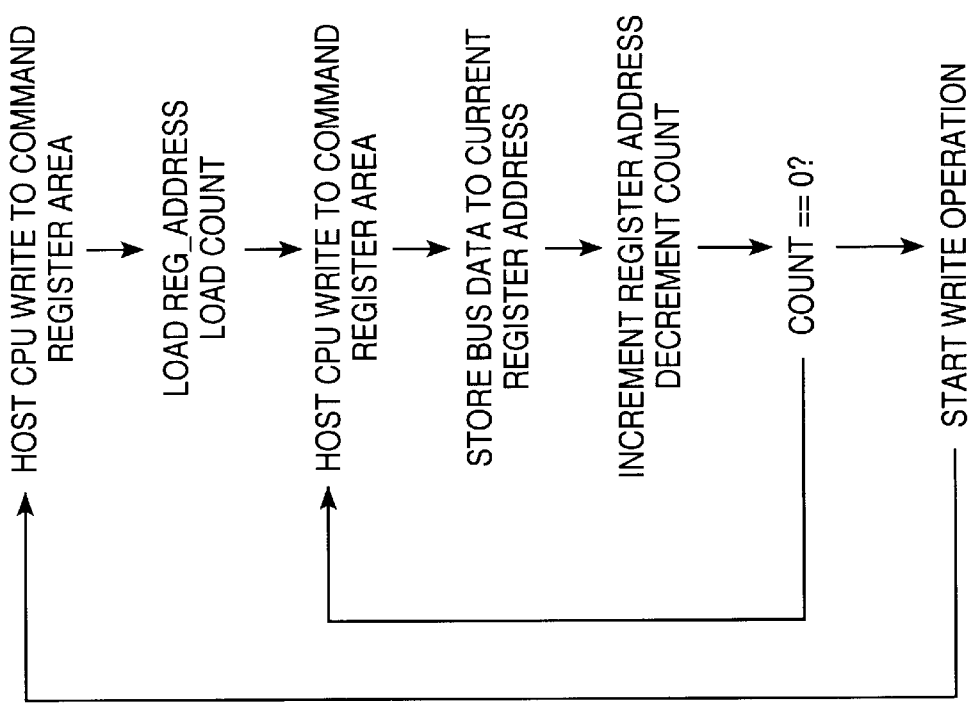

METHOD AND APPARATUS FOR PROGRAMMING A GRAPHICS SUBSYSTEM REGISTER SET

FIELD OF INVENTION

The present invention relates generally to a graphics system for personal computers. More particularly, the present invention relates to a method and apparatus for programming a register set in a graphics processor.

DESCRIPTION OF THE RELATED ART

Sophisticated graphics packages have been used for some time in expensive computer design and graphics systems. Increased capabilities of graphics controllers and display systems, combined with standardized graphics languages, have made complex graphics functions available in even the most routine applications. For example, word processor, spread sheets and desktop publishing packages now include relatively sophisticated graphics capabilities. Three-dimensional (3D) displays have become common in games, animation, multimedia, communication and drawing packages.

The availability of sophisticated graphics in PCs has driven a demand for even greater graphics capabilities. To obtain these capabilities, graphics systems must be capable of performing more sophisticated functions in less time to process greater amounts o graphical data required by modern software applications. In particular, there is a continuing need for improvements in software algorithms and hardware implementations to draw three-dimensional objects using full color, texture mapping and transparency blending.

Improvements have been made in the hardware realm. Graphics processors and accelerators are available with software drivers that interface with a host central processing unit to the graphics processor. In general, the graphics software receives information for drawing objects on a computer screen, calculates certain basic parameters associated with the objects and provides this to the graphics processor in the form of a "display list" of parameters.

A graphics controller then uses the display list values in generating the graphics objects to be displayed. A graphics processor may use interpolation techniques where the fundamental information for the object to be drawn comprises a series of initial and incremental parameters or values. The graphics processor loads or otherwise receives the initial parameters for the pixels to be drawn, interpolates the object by incrementing the parameters until the object is completely drawn.

To render the graphics objects, many prior art computer systems, program the graphics subsystem by using a mapped set of registers within the host Central Processing Unit (CPU) address range. Typically, the graphics subsystem is mapped at an address above the host CPU's local memory. A set of registers is then mapped to the smallest addressable bit location by the host CPU.

The graphics subsystem is able to read a stream of data (display list) from memory and execute programs stored in the memory in a similar manner. The size of the display list information may tend to place limitations on the traversal (read/write) speed of the central processing unit and the graphics processor.

The CPU typically builds the display list information with the instructions and parameters specific to the particular external device attached to the computer system. The external device then reads the instruction stream and executes instructions from this stream. One of the common operations stored in the display list is a command to load single and multiple registers of a device's register file with specified values.

Existing graphics implementations that use display lists typically load data in a sequential format to a register file in the graphics processor. For each type of primitive, a particular set of data values are required to render that type of primitive. For example, a point to be drawn to a pixel grid requires an X,Y location, color values and a Z value for depth comparison. An example of display list is shown below in Table I.

TABLE I

| ADDRESS | NAME | DESCRIPTXON |
|---------|------|-------------|
| 0x4000 | X | Initial X value |
| 0x4004 | Y | Initial Y value |
| 0x4008 | Z | Initial Z value |
| 0x400C | R | Initia1 Red component |
| 0x4010 | G | Initial Green component |
| 0x4014 | B | Initial Blue component |
| 0x4018 | X1 | Some other register |
| 0x401C | X2 | " |
| 0x4020 | A | Alpha blending value |

The display list in Table I provides the parameters required to draw points, lines and polygons. From the display list provided above, if a specific primitive rendering operation requires, for example, only the following register values to be loaded e.g., X,Y,R,G,B and A, a prior art load instruction would use one of two alternative methods of instruction loading.

The first of the two alternatives will be to load all nine registers e.g., "Load instruction (start at X), X,Y,Z,R,G,B, X1,X2, A". The stream of information in the display list will therefore occupy 10 instruction words (40 bytes) and load unnecessary registers.

The second load alternative is to use two consecutive load operations thereby replacing the two register load gaps (e.g., X1,X2) with only one load instruction e.g., "Load instruction (start at X), X,Y,Z,R,G,B" and "Load instruction (starts at A), A". The stream of information in the display list for this load sequence is 9 instruction words long (36 bytes).

These two prior art instruction load methods have the common feature of sequentially loading the register file with the parameter values for the primitive being rendered. Also, the load instructions comprise two fields; a first field which holds the starting parameter value and a second field which holds the incremental count of subsequent parameter values for the primitive being rendered.

FIG. 1A is a block diagram illustrating a typical prior art computer system. The computer system shown in FIG. 1A includes a host CPU 110, host memory 120 and a system bus 105 connected to the host CPU 110 to interface to external peripheral devices. The system bus 105 comprises a series of signals which may be connected to peripherals through a connector or may be connected to the peripherals directly if mounted to the CPU's 110 logic board.

A graphics subsystem 140 is also shown coupled to the system bus 105. The graphics subsystem 140 is typically programmed to render graphics primitives by using a mapped set of registers resident in the CPU's 110 address range. Typically the graphics subsystem 140 is mapped at addresses above the CPU's 110 local memory as shown in FIG. 1B.

A set of registers is mapped to the smallest addressable bit location by the CPU 110. Each graphics subsystem register when selected by the CPU is given a value from the host data bus and the register is selected when the CPU initiates a write cycle with an address which matches a bit pattern for the respective register. Each register has a particular function which may or may not affect the operation of the graphics subsystem 140.

Still referring to FIG. 1A, a bus interface chip 130 may convert the host CPU's protocol for accessing the CPU's 110 address space to a protocol defined by the bus architecture. This allows external peripherals to be mapped into the host address space in FIG. 1B. Typically for a series of sequential reads or writes from the host CPU 110, the bus protocol supports what is known as a burst bus operation.

A burst bus operation allows a single address to be presented on the bus with a series of data phases. The requirement for performing a burst cycle operation is that the data phases following the first address phase must be the smallest bit address increment supported by the bus 105.

In a typical computer using the industry standard peripheral interconnect interface (PCI) bus, the smallest bit address increment for a burst cycle is 32 bits.

If registers mapped to a specific address range are not ceased to the smallest bit address supported by the bus for a burst cycle each transfer will have to provide an address and a data phase. Since a burst cycle requires only one address phase to transfer an address, it is advantageous to use the burst bus cycles for a bus which multiplexes address and data on the same signal wires.

FIG. 2A is an exemplary diagram of a line 200 rendered in a two dimensional space in the prior art. As shown in FIG. 2A, the line 200 comprises an initial starting point (in "by" coordinates), color, a slope (x_main) and length or count_1 in "y" space. In the line illustrated in FIG. 2A, "x" and "Y" defines the initial starting point. The values of "r,g,b" define the color of the line and the count values (e.g., count_1 and count_2) define the incremental change for each successive point on the line.

In the register space shown in FIG. 2B, a series of named registers x,y,r,g,b, x_main, and count_1:count_2 are shown. If the host CPU 110 intends to instruct the graphics subsystem 140 to draw line 200 in FIG. 2A, the CPU 110 needs to program registers "x" through count_1 and the opcode register. Once the opcode register has been programmed, the graphics subsystem 140 begins drawing the line to a raster device.

In order to program another line (e.g., line 210) of the same colors, the host CPU 110 would have to program new x,y, values, ax_main value, a cout_1 value and the opcode register. Since the writes (accesses) to the register list would not be sequential as shown in FIG. 2B (i.e., writes from register 0x0 incrementally to register 0x18), the system bus controller 130 shown in FIG. 1A would have to break up the CPU's writes into multiple address and data phases for transmission.

Despite the prior methods for instruction load operations and the ability to load multiple registers contiguously to enable the efficient processing of the display parameters, several problems emerge with the method of programming registers in the graphics subsystem.

One such problem is the CPU 110 and the graphics subsystem 130 are not able to take advantage of the burst cycle protocol of the system bus 105. The transfer of multiple data and address phases may clog the system bus 105 and impede the overall performance of the CPU 110.

Another problem is that extra system memory may be needed to program the registers when the graphics processor has to store a large display list. This may impose extra cost in the overall price of the computer system. Although memory prices are getting a bit cheaper, the average amount of memory installed in many of today's multimedia computer systems continue to substantially increase. For example, a Pentium™ based multimedia computer system running MS Windows™ NT may require about at least 32 megabytes of memory to run efficiently.

As the memory requirements of these multimedia systems continue to grow, the memory required to maintain and execute very long display list needed by the multiprogramming operating systems in these computer systems become very significant. Moreover, since the memory in these systems may become locked, i.e., the operating system is not able to swap processing to the computer system's external storage device. Such a lock further reduces the amount of memory that is left for the computer system to process other system activities.

Yet another problem with the prior art graphics processor is that each register is programmed sequential with absolute address references to each register. This means that a register has to be programmed before a subsequent register in a register set. This can often be time consuming and in bus architectures using a burst mode of transfer, like a PCI bus, such absolute address reference becomes a bottleneck which impacts the overall performance of the computer system.

As more and more of the computer's processing power is transferred to the central processing unit, the processing of graphics parameters to generate graphics display end up being bottlenecks in processing instructions by the CPU. This problem becomes even more pronounce if the processing of graphics data is transferred from a separate graphics processing chip off device to the CPU.

Thus, a method of programming registers within the graphics subsystem while maintaining the processing speed of CPU is needed. The present invention provides the advantageous functionality of programming the graphics subsystem registers set without absolute reference to each register to allow the system bus to generate burst write cycles to program the registers.

SUMMARY OF THE INVENTION

In accordance with the present invention, a graphics processor for generating sequential address programming through a sequential address range without absolute address references to each register is provided. The present invention provides a system which is able to handle the increasing amount of graphics data processed in many present day multimedia computer systems, without requiring excessive amount of memory resources.

Embodiments of the present invention include: a computer controlled graphics display system having: a processor coupled to a bus; a memory unit coupled to the system bus for storing the display list; a graphics processor for receiving microinstructions from the display list stored in the memory unit; a set of register files coupled to the graphics processor for storing the display list in the graphics processor; and a private memory area disposed within the memory unit for storing address offsets of the display list, wherein named instructions generated by the central processor replace other means of randomly loading the register file in the graphics processor.

Embodiments further include the above and wherein the display list comprises parameterization procedures for processing polygon primitives, sets of graphics lines, and sets of graphics points and wherein the parameterization procedure are further for processing translation between different graphics formats.

Embodiments further include the above and wherein a command format is used to encode address and data information for the specific register to be programmed.

Embodiment further include the above and wherein each command is written sequentially to a sequential address range providing a mechanism for the bus controller to perform burst write cycles. Since the graphics sub-system is programmed using burst write cycles, the amount of time needed to program a rendering operation for the graphics sub-system is substantially reduced.

The graphics processor also preferably includes an internal instruction execution unit that receives the opcode from a prefetch unit and decodes the opcode. The execution unit also receives the display list and stores the display list in a register file.

BRIEF DESCRIPTION OF THE DRAWINGS

A better understanding of the present invention can be obtained when the following detailed description of the preferred embodiment is considered in conjunction with the following drawings in which:

FIG. 1B is a diagram of an exemplary address space of the central processing unit of FIG. 1A;

FIG. 6 is a simplified diagram of the state machine of the graphics processor of FIG. 4.

DETAIL DESCRIPTION OF THE PRESENT INVENTION

A method and apparatus for providing shorter display lists without losing the quality of the display information supplied to the graphics device is disclosed.

In the following detailed description of the present invention, numerous specific details are set forth in order to provide a thorough understanding of the present invention. However, it will be obvious to one skilled in the art that the present invention may be practiced without these specific details or by using alternate elements or methods. In other instances well know methods, procedures, components, and circuits have been described in detail as not to unnecessarily obscure aspects of the present invention.

Some portions of the detailed description which follow are represented in terms of procedures, logic blocks, processing, and other symbolic representations of operations on data bits within a computer system. These descriptions and representations are the means used by those skilled in the art to most effectively convey the substance of their work to other skilled in the art. A procedure, logic block, process etc., is herein, and generally, conceived to be a self-consistent sequence of steps or instructions leading to a desired result. The steps are those requiring physical manipulations of physical quantities. Usually, magnetic signals capable of being stored, transferred, combined, compared, and otherwise manipulated in a computer system. For reasons of convenience, and with reference to common usage, these signals are referred to as bits, values or the like with reference to the present invention.

It should be borne in mind, however, that all of these terms are to be interpreted as referencing physical manipulations and quantities and merely convenient labels and are to be interpreted further in view of terms commonly used in the art. Unless specifically stated otherwise as apparent from the following discussions, it is understood that thorough discussions of the present invention, discussions utilizing terms such as "processing" or "computing" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

Figure 3:
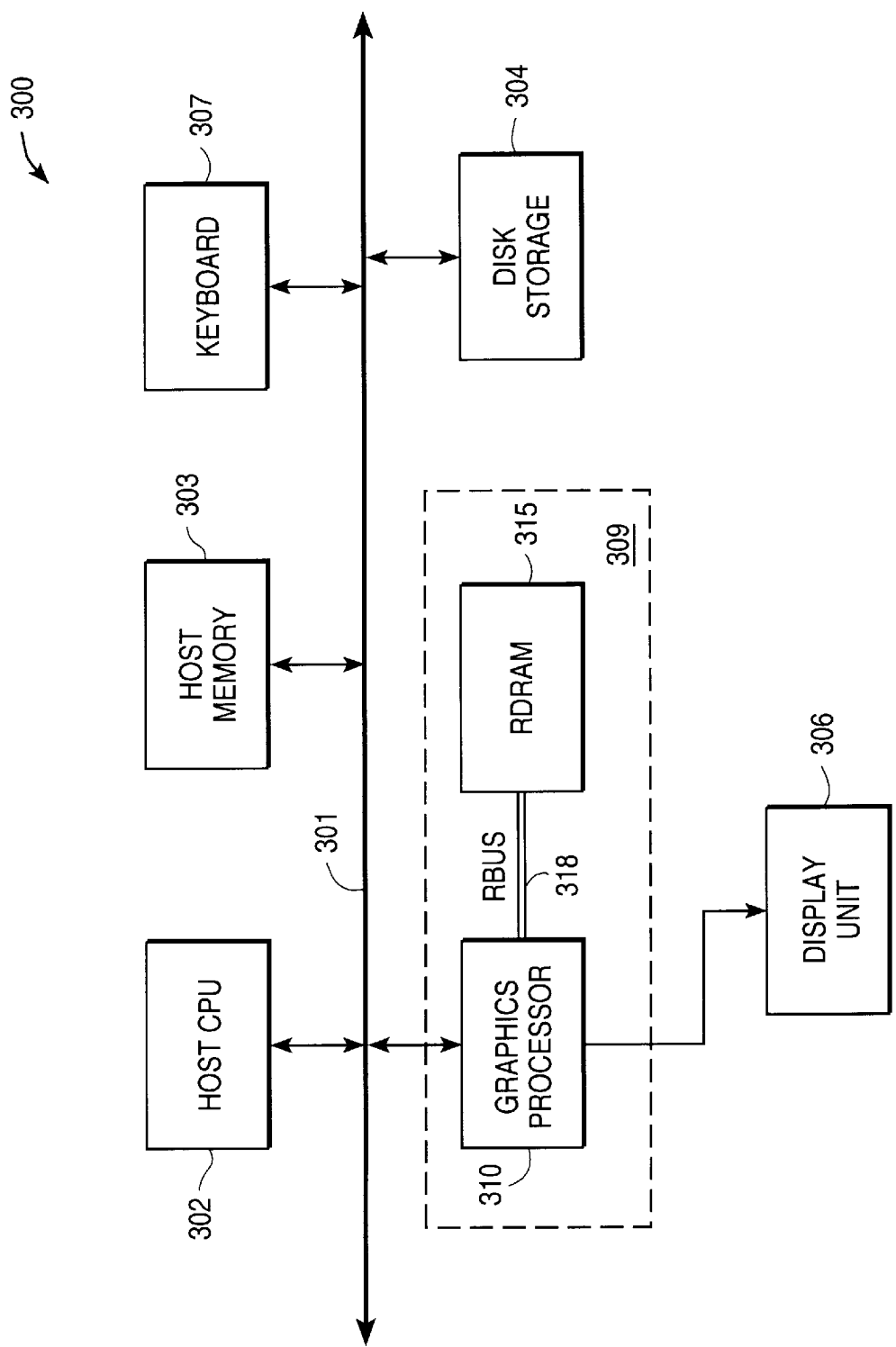
FIG. 3 is a simplified block diagram of a computer system having a graphics subsystem, in accordance to the teachings of the present invention.

With reference to FIG. 3, a block diagram is shown of a host computer system 300 used by the preferred embodiment of the present invention. In general, host computer 300 comprises a bus 301 for communicating data and instructions, a host processor (CPU) 302 coupled to bus 301 for processing data and instructions, a computer readable non-volatile memory unit 303 coupled to bus 301 for storing data and instructions from the host processor 302, a computer readable data storage device 304 coupled to bus 301 for storing data and display device 306 coupled to bus 301 for displaying information to the computer user. The display device 306 utilized with the computer system 300 of the present invention can be a liquid crystal device, cathode ray tube, or other display device suitable for creating graphics images and alphanumeric characters recognizable to the computer user.

The host system 300 provides data and control signals via bus 301 to a graphics hardware subsystem 309. The graphics hardware 309 includes a graphics processor 310 which executes a series of display instructions found within a display list 430. The graphics display processor 310 supplies data and control signals to a frame buffer which refreshes the display device for rendering images on display device. Alternatively, the host processor 302 may write the display list to the graphics processor 310 in accordance with known techniques.

It should be understood that the particular embodiment shown in FIG. 3 is only one of many possible implementations of a graphics system for use in a computer system. FIG. 3 is simplified for purposes of clarity so that many components and control signals are omitted which are not necessary to understand the present invention.

In the preferred embodiment, the graphics processor 310 provides hardware support for 2D and 3D graphics, and for text and windowing operations of a computer system. The graphics processor 310 transfers digital data from the system memory 303 or host processor 302, and processes data for storage in the RDRAM 315 ultimately for display on the display unit 306.

In accordance with the preferred embodiment, the host processor 302 provides necessary parameter values in the form of a display list, which typically is stored in system memory 303 until required by graphics processor 310.

The host processor 302 and system memory 303 both preferably communicate with the graphics processor 310 via the system bus 301. The system bus 301 preferably is the peripheral component interconnect (PCI) bus.

Still referring to FIG. 3, the graphics processor 310 couples to the system bus 301. In accordance with the preferred embodiment, the graphics processor 310 preferably includes bus mastering capabilities, thus permitting graphics processor 310 to bus master the system bus 301. Graphics processor 310 also couples to a display unit and a RDRAM 315.

In the preferred embodiment, the RDRAM 315 comprises a bank of RDRAM buffers, where the digital data stored in the RDRAM comprises a rectangular array of picture elements referred to as pixels or pixel values. Each pixel can be defined by an 8 bit value, for example, which specifies the intensity of a single color of a corresponding pixel on a screen of the display unit 306.

Figure 4:
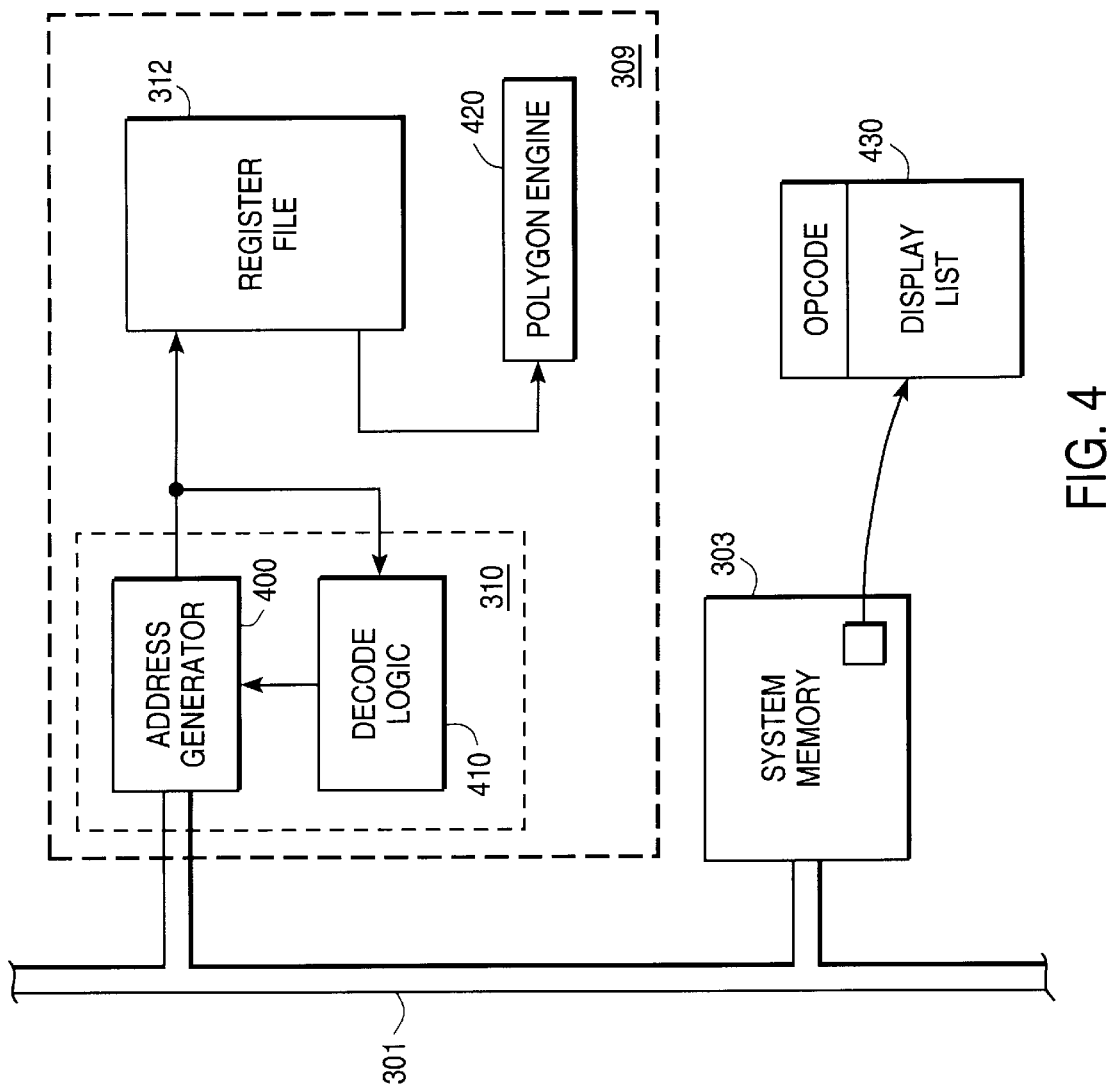
FIG. 4 is a simplified block diagram showing in detail the graphics subsystem of FIG. 3.

The graphics device 309 hosts an array of volatile memory unit referred to as register file 312 (FIG. 4). The register file 312 holds working information of the graphics device. The register file also stores information and commands needed for operation of the graphics device 309.

The display unit 306 may be any suitable type of display device, such as a cathode ray tube (CRT) for desktop, workstation or server applications, a liquid crystal display (LCD) or any other suitable display device for a personal computer.

The RDRAM frame buffer 315 provides a performance improvement by permitting faster access to display list instructions and pixel data, compared to accessing data stored in the main memory 303 of the host computer system 300. The graphics processor 310 communicates to the RDRAM buffer 315 through address data and control lines, collectively referred to as a RBUS 318.

Referring now to FIG. 4, the graphics subsystem 309 preferably includes a register file 312, a graphics processor 310 a polygon engine 420, and a frame buffer 315. Generally the register files 312 comprises a plurality of registers for storing the display list information.

The register address generator 400 generates an address pertaining to a register in the register file 312 and transmits the address over signal lines to the register file 312. The data in the register at an address N is then transmitted over the system bus 301 to the register files. In the present invention, the graphics processor 310 utilizes the burst cycle protocol of the system bus 301 to transfer multiple addresses to the host CPU 302.

Decode logic 410 receives operational code instructions which includes the opcode itself and an address field information which tells the graphics processor 310 where to start loading addresses in the register files 312. From the operational code instructions, Decode logic 410 is able to establish where in the register file 312 to begin loading addresses and continually load multiple registers regardless of what the CPU generates to the graphics processor 310.

Decode logic 410 preferably includes an address load counter to count the number of address being loaded into the file register. Decode logic further includes a state machine which preferably directs the address generator to increment addresses to the next address corresponding to the next value in the register file.

Register file 312 stores display parameter addresses decoded by Decode logic 410. In the preferred embodiment of the present invention, register file 312 is sequentially loaded with parameter addresses without reference to the physical address location. Thus address locations in the register may be simultaneously loaded during a burst cycle write operation by the host CPU 302 to write display parameter addresses from the register file 312 to the polygon and texture engines 420 for rendering the desired graphics primitives.

Figure 5:
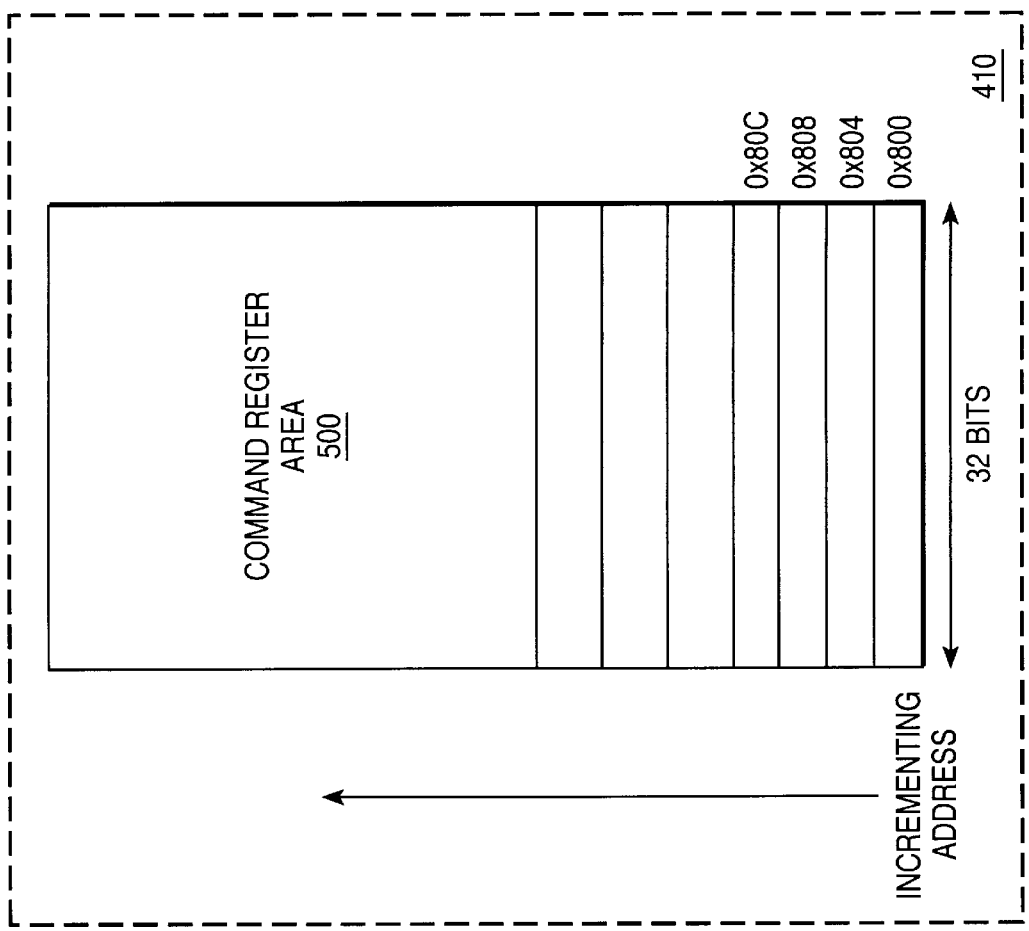
FIG. 5 is a simplified diagram showing in more detail the command register of the graphics processor of FIG. 4, in accordance with the principles of the present invention.

FIG. 5 is a simplified block diagram of an exemplary of an embodiment of the command register 500 of the preferred embodiment of the present invention. As shown in FIG. 5, the command register 500 preferably includes a command register area and a series of storage locations.

Figure 1A:
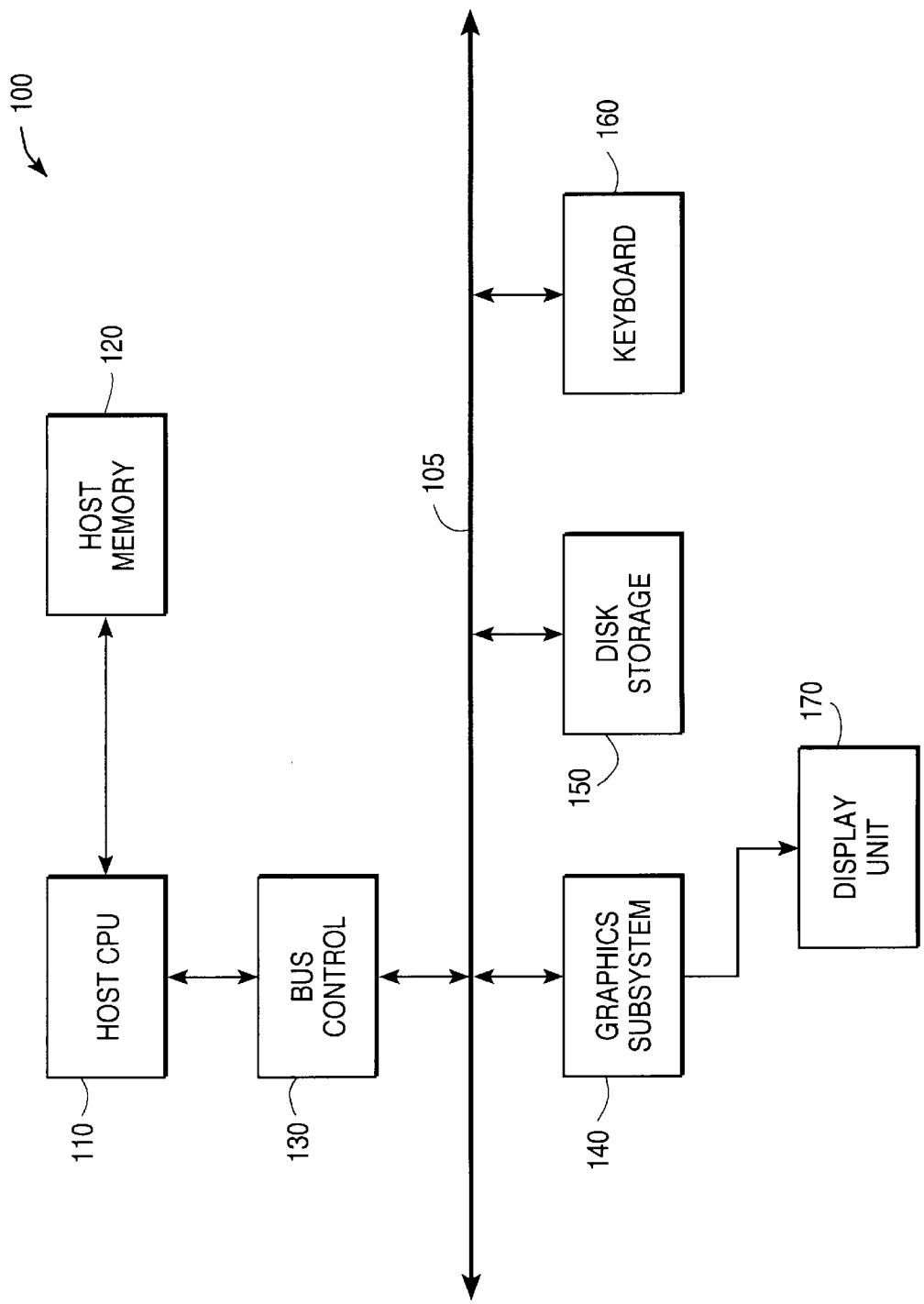
FIG. 1A is a simplified block diagram of a prior art computer system including a host central processor, a graphics subsystem coupled to a system bus and a system memory for storing display parameters.
Figure 2A:
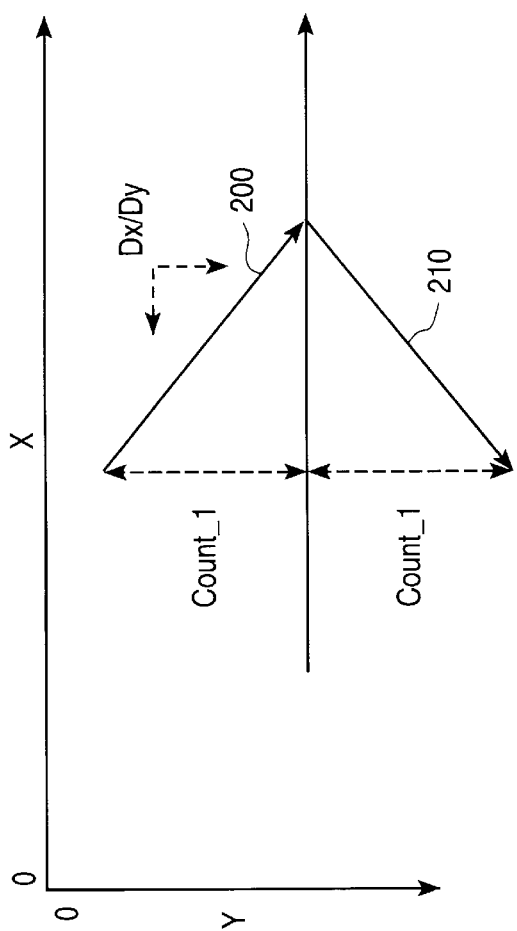
FIG. 2A is a simplified block diagram of an exemplary line rendered in two dimensional space by the graphics subsystem of FIG. 1A.
Figure 2B:
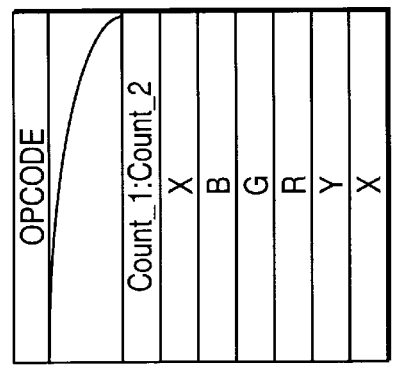
FIG. 2B is a diagram of the register space for storing the parameters for rendering the line shown in FIG. 2A.

To draw a graphics primitive, for example a line, in the present invention, the host CPU use the command register area to load register locations in the register file to store the x,y,r,g,b, x__main, count1:count__2 and the opcode register locations as illustrated in FIG. 1B. Using the command register area in FIG. 5 eliminates the need for the host CPU to perform address specific register loading. An opcode is first written to address offset location 0x0 of the command register. Writing the address offset instructs the graphics processor that a line, for example, is to be drawn and the number of writes which follow to be loaded into the starting register.

Referring now to FIG. 6 is a simplified flow diagram of the state machine of the decode logic unit 410 of FIG. 4. As shown in FIG. 6 in state 1, the CPU writes an operation code instruction to the command register. This instructs the graphics processor that a graphics primitive is to be drawn.

In state 2, the opcode is decoded to loaded a starting reg__address and the count in the decode logic unit. From this state, the instruction process flow begins a loop based on the address count.

As the CPU writes to the command register area in state 2, the state machine sequences through loading data from the system bus to the register address, then increments the reg__address and decrements the count.

In state 3, the count is tested for zero to determine if all writes have been performed. If the count is not zero, the loop continues to state 1. Once the count is zero, the graphics processor starts the CPU write cycle.

Thus, the registers in the register file are virtually loaded with graphics primitives address without a physical reference to each register location that are necessary to render the primitive. Numerous variation of the described preferred embodiment of the present invention may be apparent to those skilled in the art once the above disclosure is fully appreciated. It is intended that the following claims be interpreted to embrace all such modification and variations.

What is claimed is:

1. A system for rendering graphics primitives during a burst write cycle operation, the system comprising:

a system bus for communicating data and instructions and generating burst write cycles;

a host processor coupled to the system bus for generating graphics primitive address requests to the system bus;

a system memory coupled to the system bus for storing a display list of parameters responsive to the graphics primitives;

a graphics subsystem coupled to the system bus for processing the graphics primitives address requests generated by the host processor, the graphics subsystem including decode logic, the decode logic having therein a command register and a register file for storing parameter values at sequential addresses in the register file, wherein an addresses stored in the register file are sequentially stored without reference to the physical graphics primitive address values generated by the host processor; and a display unit coupled to the graphics subsystem for displaying the graphics primitives corresponding to the addresses generated by the host processor.

2. The system of claim 1, wherein the register file stores the address values of the requested graphics primitives by the host processor.

3. The system of claim 2, wherein the graphics subsystem further includes an address generating means for generating address offsets bits responsive to the display parameter values corresponding to the addresses generated by the host processor.

4. The system of claim 3, wherein the graphic subsystem further includes logic for interpreting operational code instructions to determine the sequence of write accesses to the register file to render a desired graphics primitive.

5. The system of claim 4, wherein the system bus is a peripheral connect interface (PCI) bus.

6. A graphics subsystem for handling burst write cycle address request for rendering graphics primitives responsive to the address request, comprising:

a graphics processor disposed within the graphics subsystem for decoding and generating addresses for the graphics primitives to be rendered, said graphics processor generating the addresses in a burst write cycle mode of operation, graphics processor including a decode logic unit for decoding graphics primitive addresses received by the graphics processor to generate the corresponding graphics primitives, the decode logic unit includes a command register for programming registers;

a register file comprising a plurality of storage locations coupled to the graphics processor to receive and store the graphics primitive address values, the registers in the register file programmed using the command register; and a texture and polygon engine coupled to the register file to render the graphics primitives.

7. The graphics subsystem of claim 6, wherein the graphics processor further includes an address generator for generating addresses for a desired graphics primitive to be rendered.

8. The graphics subsystem of claim 7, wherein the graphics processor programs the plurality of register in the register file through a sequential address range without absolute address referencing to each register.

9. A graphics processor for programming graphics primitives addresses to perform burst write cycle operations, comprising:

an address generator disposed within the graphics processor to generate address corresponding to a graphics primitive to be rendered, a decode logic unit coupled to the address generator to decode the addresses generated by the address generator, wherein a sequential range of addresses is decoded and mapped into a host system memory address range to allow the graphics processor to generate burst write cycle to program registers in a register file, the decode logic unit having a command register for receiving and determining the registers to load in the register file, wherein said command register eliminates the need for the graphics processor to address specific register loading in the register file; and programming logic for programming the registers in the register file.

10. The graphics processor of claim 9, wherein the decode logic unit includes a state machine for instructing the graphics processor the type of graphics primitive to rendered and the number of data write phases that follows an initial starting address of the graphics primitive.

11. The graphics processor of claim 10, wherein address writes to the command register are programmed through a sequential range of addresses without reference to each register in the register file.

* * * * *